United States Patent [19]

Wlodarczyk

[11] Patent Number: 4,727,254

[45] Date of Patent: Feb. 23, 1988

[54] DUAL WAVELENGTH MICROBEND SENSOR

[75] Inventor: Marek T. Wlodarczyk, Sterling Heights, Mich.

[73] Assignee: General Motors Corporation, Detroit, Mich.

[21] Appl. No.: 931,520

[22] Filed: Nov. 17, 1986

[51] Int. Cl.[4] ................................................ G01J 1/00
[52] U.S. Cl. .................................... 250/338; 250/339; 250/227
[58] Field of Search ................... 250/339, 227, 338 R

[56] References Cited

U.S. PATENT DOCUMENTS

| | | | |
|---|---|---|---|
| 4,356,396 | 10/1982 | Ruell et al. | 250/227 |
| 4,412,722 | 11/1983 | Carnevale et al. | 350/96.31 |
| 4,567,366 | 1/1986 | Shinohara | 250/339 |
| 4,596,925 | 6/1986 | Gilby | 250/227 |

OTHER PUBLICATIONS

Marcuse, Dietrich, "Microdeformation Losses of Single-Mode Fibers", *Applied Optics*, vol. 23, No. 7, 1 Apr. 1984, pp. 1082-1091.

*Primary Examiner*—Janice A. Howell
*Assistant Examiner*—William F. Rauchholz
*Attorney, Agent, or Firm*—Warren D. Hill

[57] ABSTRACT

A microbend fiber optic sensor uses a dual wavelength to determine the effect of microbending without interference from unwanted signal fluctuations arising from component changes, for example. Periodic microbending losses in single mode, step index fiber optics depend critically upon the wavelength whereby a modulation wavelength can be chosen close to a reference wavelength so that both are affected equally by the unwanted fluctuations but only the modulation wavelength is affected by the microbending. The ratio of the two signals or a log of the ratio yields a value which responds only to the microbend induced signal.

3 Claims, 2 Drawing Figures

DUAL WAVELENGTH MICROBEND SENSOR

FIELD OF THE INVENTION

This invention relates to a fiber optic microbend sensor and particularly to such a sensor which uses two wavelengths of radiation to obtain an output free of fluctuations due to changes in components in the optical link.

BACKGROUND OF THE INVENTION

It is well known in the case of optical measuring instruments to use dual optical beams comprising a modulation beam and a reference beam to distinguish between changes due to the test parameter and any other changes which tend to obfuscate the parameter induced signal. The modulated signal beam is subject to the test parameter as well as undesirable influences such as variations in the light source intensity, coupling variations or variable temperature response of detectors, and the reference beam is subject to all the same influences except the test parameter. By comparing the two beams the changes due to the test parameter are readily isolated.

Fiber optic microbend sensors have incorporated the dual beam principle by using one optical fiber subject to microbending to obtain a modulation signal carrying the parameter information along with unwanted fluctuations and a separate reference optical fiber operating at the same wavelength but not subject to microbending to obtain a reference signal carrying only the unwanted fluctuations so that a comparison of the two outputs allows the true microbend signal value to be determined. Since separate optical paths are required, the two signals are not necessarily subject to the same disturbances.

It is desirable to eliminate the reference fiber since it introduces expense and complexity to the sensor, yet it is necessary to compensate for the unwanted fluctuations. Prior to this invention it had been believed that different wavelengths in an optical fiber subject to microbending were similarly affected by microbending. In particular, wavelengths of comparable value were reported to experience only slight dispersion of microbending losses and would not be useful for the single fiber microbend sensor disclosed herein. See, for example, D. Marcuse, "Microdeformation Losses of Single-mode Fibers," *Appl. Opt.*, Vol, 23, 1082-1091, 1984. That report concerned random microbending. Similar results were known for periodic microbending in multimode fibers.

SUMMARY OF THE INVENTION

It is therefore an object of the invention to provide a single fiber microbend sensor compensated for unwanted fluctuations.

The invention is carried out by a microbend fiber optic sensor free of undesired fluctuations due to component changes comprising; a single mode, step index optical fiber subject to strong dispersion of microbending losses, periodic microbending means coupled to the fiber for deforming the fiber in accordance with a parameter, source means for transmitting radiation at a modulation signal wavelength subject to strong microbending loss and at a reference signal wavelength substantially unaffected by microbending loss, both wavelengths being similarly affected by component changes, and detector means for receiving the radiation and comparing the modulation signal wavelength and the reference signal wavelength to determine the microbending modulation of the modulation signal wavelength.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

Figure 1:
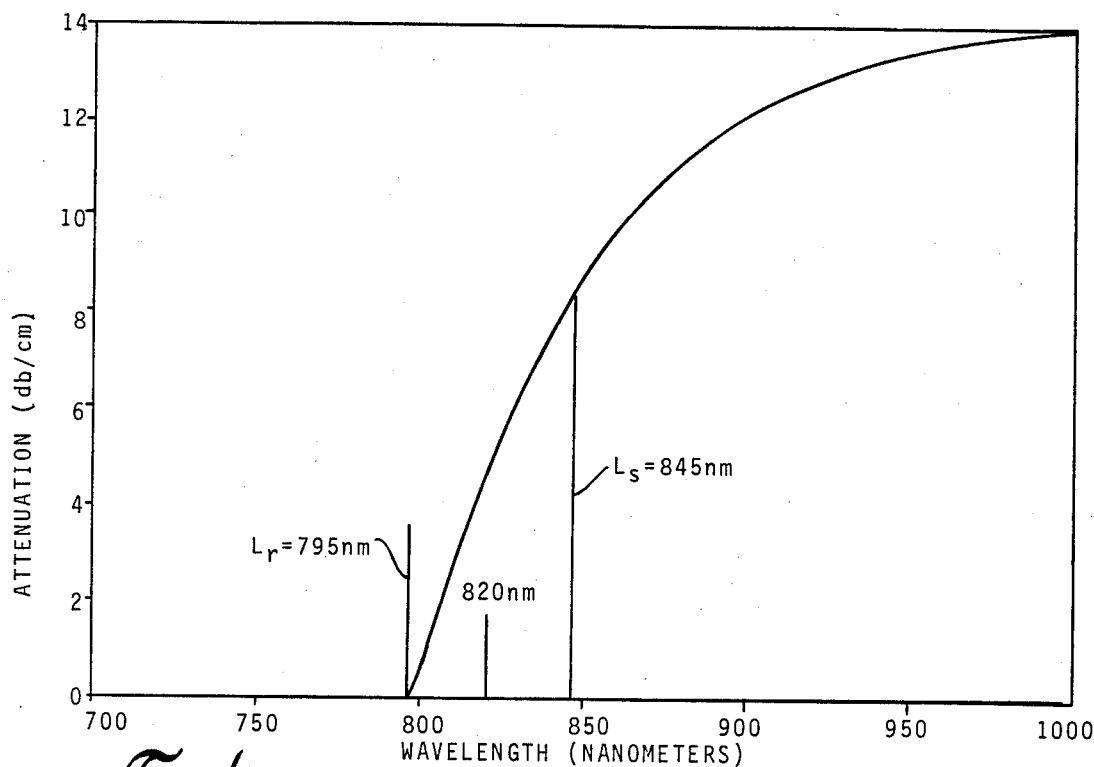
FIG. 1 is a graph illustrating the wavelength dispersion due to fiber optic microbending losses.

The microbend sensor according to this invention is based upon my discovery that in single mode fibers, especially the step index type, periodic microbending losses are strongly wavelength dependent. Moreover the losses experience a peak at one wavelength and reach a cut-off threshold at a wavelength near the peak. This is illustrated in FIG. 1 wherein the attenuation due to microbend loss is plotted against wavelength for some fixed degree of microbend deformation. The peak loss occurs at a wavelength near 1000 nanometers and the losses drop to zero at a wavelength near 800 nm. It is a valuable property of a sensor to have a reference wavelength near the modulation wavelength so that the modulation signal wavelength $L_s$ can be maximized and the reference signal wavelength $L_r$ can be so close that even wavelength dependent fluctuations will affect the two wavelengths substantially equally. Thus if the modulation signal wavelength is chosen just above the cut-off threshold in a substantially high loss region of the curve, the reference wavelength can lie just below the threshold. The two wavelengths are compared to reveal the signal variations that are due solely to microbend losses. It is preferred to compare the wavelengths by calculating the ratio or the log of the ratio of the two signals.

Figure 2:
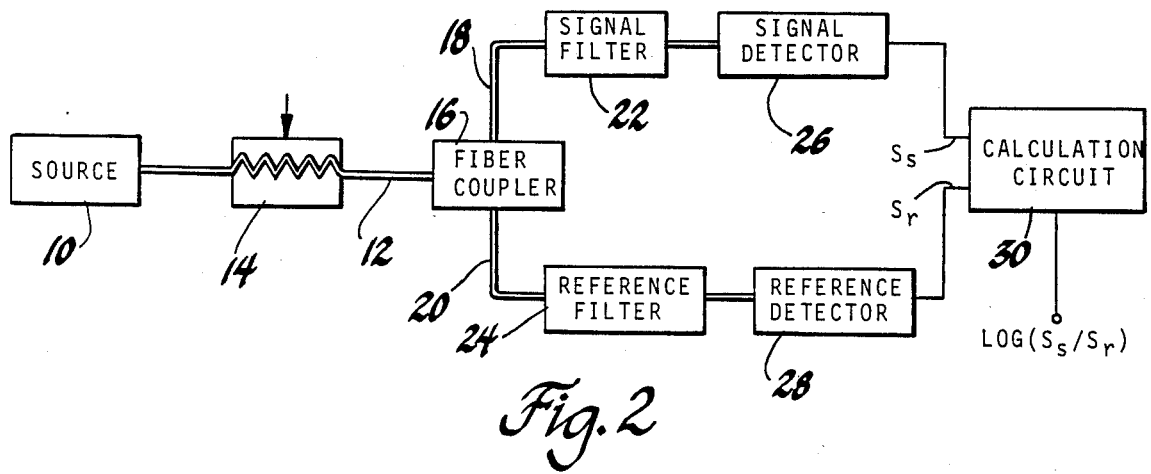
FIG. 2 is a view of a microbend sensor according to the invention.

The apparatus, as shown in FIG. 2, comprises a light source 10 emitting radiation containing the desired modulation and reference wavelengths, a single mode optical fiber 12, a microbend device 14 coupled to the fiber 12, a coupler 16 for dividing the optical path into two paths 18 and 20, narrow band filters 22 and 24 for the modulation signal and reference signal wavelengths, respectively; modulation and reference detectors 26 and 28 at the respective filters for generating the electrical signals $S_s$ and $S_r$, and a calculation circuit 30 receiving the signals and determining the log of the signal ratio log $(S_s/S_r)$.

The fiber 12 is a step index optical fiber for carrying a single mode of radiation. The microbend sensor 14 is the periodic kind and responds to a force as indicated by the arrow to induce microbending in the fiber 12 at a fixed period which results in radiation losses at the modulation signal wavelength. The force may be a measure of strain, pressure or other parameter that could be translated into a force. The source is an LED having a sufficiently broad band to include the modulation and the reference wavelengths, and each filter 22, 24 comprises a grating or interference filter which yields a narrow bandwidth at the proper wavelength.

For example, the source 10 is a GaAlAs LED emitting at 820 nm with 50 nm, 3 dB bandwidth. The fiber 12 is a single mode fused silica fiber having an 8 micron diameter core and 125 micron diameter cladding with a numerical aperture of 0.11. The interference filters 22 and 24 have 10 nm bandwidth centered at 845 nm and 795 nm wavelength and the detectors 26 and 28 are Si PIN photodiodes. The microbend loss device 14 is a grating having 20 grooves at a period of 1.7 mm which is pressed against the fiber 12 to induce lateral deformations in the fiber in accordance with the parameter being measured.

In operation, the microbend deformations cause attenuation of the source radiation proportional to the rates shown in FIG. 1 for the various wavelengths, the actual amount of attenuation of the signal wavelength $L_s$ being dependent on the degree of microbend deformation. The reference wavelength $L_r$ is not appreciably attenuated, although in the example given here, some slight effect is produced due to the overlap of the reference filter 24 with the attenuation curve below 800 nm.

The detectors measure the radiation in the narrow bands defined by the filters and the resulting signals $S_s$ and $S_r$ are compared by the calculation circuit 30 to obtain $\log(S_s/S_r)$. Any fluctuations in the source output intensity or other perturbations in the optical link will affect the signal wavelengths substantially equally and will not affect the output ratio.

It will thus be seen that the invention provides an improved microbend sensor since only a single fiber is required and all the benefits of a reference signal are not only retained but enhanced because the reference radiation, except in the detection stage, experiences the same optical path as the modulated radiation.

The embodiments of the invention in which an exclusive property or privilege is claimed are defined as follows:

1. A microbend fiber optic sensor free of undesired fluctuations due to component changes comprising;
   a single mode, step index optical fiber subject to strong dispersion of microbending losses,
   periodic microbending means coupled to the fiber for deforming the fiber in accordance with a parameter,
   source means for transmitting radiation into the fiber at a first wavelength subject to strong microbending loss and at a reference wavelength substantially unaffected by microbending loss, both wavelengths being similarly affected by component changes, and
   detector means for receiving the radiation and comparing the first wavelength and the reference wavelength to determine the microbending modulation of the first wavelength.

2. A microbend fiber optic sensor free of undesired fluctuations due to component changes comprising;
   a single mode, step index optical fiber subject to strong dispersion of microbending losses,
   periodic microbending means coupled to the fiber for deforming the fiber in accordance with a parameter,
   source means for transmitting radiation into the fiber at a modulation wavelength subject to strong microbending loss and at a reference wavelength substantially unaffected by microbending loss, the wavelengths being within 10% of each other and being similarly affected by component changes, and
   detector means for receiving the radiation and computing the logarithmic ratio of the modulation wavelength and the reference wavelength to determine the microbending modulation of the modulation wavelength independently of changes unrelated to the parameter.

3. A microbend fiber optic sensor free of undesired fluctuations due to component changes comprising;
   a single mode, step index optical fiber subject to strong dispersion of microbending losses,
   periodic microbending means coupled to the fiber for deforming the fiber in accordance with a parameter,
   a radiation source for transmitting radiation into the fiber at a modulation wavelength subject to strong microbending loss and at a reference wavelength substantially unaffected by microbending loss, both wavelengths being within 10% of each other and being similarly affected by component changes, and
   detector means including dual wavelength filter means for receiving the modulation and reference wavelengths of the radiation and computing the logarithmic ratio of the modulation wavelength and the reference wavelength to determine the microbending modulation of the signal wavelength.

* * * * *